United States Patent
Lee et al.

(10) Patent No.: US 9,429,949 B2
(45) Date of Patent: Aug. 30, 2016

(54) ROBOT CLEANER AND CONTROLLING METHOD THEREOF

(75) Inventors: Jeihun Lee, Seoul (KR); Suuk Choe, Seoul (KR); Hyuksoo Son, Seoul (KR); Donghoon Yi, Seoul (KR); Younggie Kim, Seoul (KR); Jeongsuk Yoon, Seoul (KR); Seongsoo Lee, Seoul (KR); Taegon Park, Seoul (KR); Yiebin Kim, Seoul (KR); Yoojin Choi, Seoul (KR); Sangik Na, Seoul (KR); Seungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 13/509,342

(22) PCT Filed: Nov. 11, 2010

(86) PCT No.: PCT/KR2010/007940
§ 371 (c)(1),
(2), (4) Date: May 11, 2012

(87) PCT Pub. No.: WO2011/062396
PCT Pub. Date: May 26, 2011

(65) Prior Publication Data
US 2012/0232697 A1    Sep. 13, 2012

(30) Foreign Application Priority Data
Nov. 17, 2009   (KR) .................. 10-2009-0111115

(51) Int. Cl.
G05B 15/00        (2006.01)
G05B 19/00        (2006.01)
G05D 1/02         (2006.01)

(52) U.S. Cl.
CPC ......... *G05D 1/0246* (2013.01); *A47L 2201/04* (2013.01); *A47L 2201/06* (2013.01); *G05D 2201/0203* (2013.01); *G05D 2201/0215* (2013.01)

(58) Field of Classification Search
CPC .......... B25J 9/0003; B25J 9/19; B25J 13/08; B25J 19/04; B25J 5/00; A47L 9/28; A47L 9/00; A47L 11/24; G05D 1/021; G05D 1/02
USPC ............... 700/245, 253, 254, 258, 259, 262; 901/1, 9, 47; 318/568.12, 587; 134/18, 134/56 R, 57 R, 167 R, 6, 21; 15/319
See application file for complete search history.

(56) References Cited

U.S. PATENT DOCUMENTS 6,459,955 B1 *  10/2002   Bartsch et al. ............... 700/245
6,496,754 B2 *  12/2002   Song et al. .................... 700/245
(Continued)

FOREIGN PATENT DOCUMENTS

JP    2002-078650 A       3/2002
JP    2002078650 A  *    3/2002
(Continued)

OTHER PUBLICATIONS

JP2002078650A (Machine_English_translation).*
(Continued)

*Primary Examiner* — Jason Holloway
*Assistant Examiner* — Rachid Bendidi
(74) *Attorney, Agent, or Firm* — KED & Associates LLP (57) ABSTRACT

Disclosed are a robot cleaner capable of performing a cleaning operation by selecting a cleaning algorithm suitable for the peripheral circumstances based on an analysis result of captured image information, and a controlling method thereof. The robot cleaner comprises an image sensor unit configured to capture image information when an operation instructing command is received, and a controller configured to analyze the image information captured by the image sensor unit, and configured to control a cleaning operation based on a first cleaning algorithm selected from a plurality of pre-stored cleaning algorithms based on a result of the analysis.

14 Claims, 3 Drawing Sheets

(56) References Cited

U.S. PATENT DOCUMENTS

| | | | |
|---|---|---|---|
| 6,697,147 B2 * | 2/2004 | Ko et al. | 356/4.03 |
| 6,732,826 B2 * | 5/2004 | Song et al. | 180/169 |
| 6,841,963 B2 * | 1/2005 | Song et al. | 318/568.12 |
| 8,374,721 B2 * | 2/2013 | Halloran et al. | 700/245 |
| 2002/0153184 A1 * | 10/2002 | Song | A47L 9/009 180/167 |
| 2004/0016077 A1 * | 1/2004 | Song et al. | 15/319 |
| 2004/0204792 A1 * | 10/2004 | Taylor et al. | 700/245 |
| 2004/0207355 A1 * | 10/2004 | Jones et al. | 318/568.12 |
| 2005/0010331 A1 * | 1/2005 | Taylor et al. | 700/245 |
| 2006/0190133 A1 * | 8/2006 | Konandreas et al. | 700/245 |
| 2007/0250212 A1 * | 10/2007 | Halloran et al. | 700/245 |
| 2007/0285041 A1 * | 12/2007 | Jones et al. | 318/568.12 |
| 2008/0001566 A1 * | 1/2008 | Jones et al. | 318/568.17 |
| 2008/0015738 A1 * | 1/2008 | Casey et al. | 700/258 |
| 2008/0249661 A1 * | 10/2008 | Hong et al. | 700/252 |
| 2009/0038089 A1 * | 2/2009 | Landry et al. | 15/3 |
| 2009/0281661 A1 * | 11/2009 | Dooley et al. | 700/258 |
| 2010/0049364 A1 * | 2/2010 | Landry et al. | 700/245 |
| 2010/0115716 A1 * | 5/2010 | Landry et al. | 15/3 |
| 2010/0263142 A1 * | 10/2010 | Jones et al. | 15/21.1 |
| 2011/0144805 A1 * | 6/2011 | Chiappetta et al. | 700/253 |
| 2012/0265343 A1 * | 10/2012 | Gilbert et al. | 700/259 |

FOREIGN PATENT DOCUMENTS

| | | | |
|---|---|---|---|
| JP | 2005211367 A | * | 8/2005 |
| JP | 2006-346178 A | | 6/2008 |
| KR | 10-0406636 B1 | | 11/2003 |
| KR | 10-2004-0062040 A | | 7/2004 |

OTHER PUBLICATIONS

Translation for reference JP2005211367A.*
International Search Report and Written Opinion dated Aug. 19, 2011 issued in Application No. PCT/KR2010/007940.
Anderson, Nils Axel et al.: "Combining a Novel Computer Vision Sensor with a Cleaning Robot to Achieve Autonomous Pig House Cleaning"; 44th IEEE Conference on Decision and Control, and the European Control Conference 2005; Seville, Spain; Dec. 12-15, 2005; pp. 8331-8336 (XP-010885139).
Griffin, Colin, An Automated Cleaning System for Hospitals, School of Mechanical and Manufacturing Engineering [retrieved on Mar. 21, 2014]. Retrieved from the Internet <URL: http://doras.dcu.ie/14901/1/Final_ethesis.pdf> (XP-055109290).
European Search Report dated Jul. 8, 2014, issued in Application No. 10 83 1763.7.

* cited by examiner

ROBOT CLEANER AND CONTROLLING METHOD THEREOF

TECHNICAL FIELD

Some exemplary embodiments of the present disclosure relates to a robot cleaner and a controlling method thereof.

BACKGROUND ART

Generally, a robot has been developed for an industrial use, and has managed some parts of factory automation. As the robot is applied to various fields recently, medical robots, space robots, home robots, etc. are being developed.

A representative of the home robot is a robot cleaner, a kind of home electronic appliance capable of performing a cleaning operation by sucking peripheral dust or foreign materials with autonomously moving on a predetermined region.

This robot cleaner is provided with a chargeable battery, and cleans a predetermined region with autonomously moving.

DISCLOSURE OF INVENTION

Solution to Problem

According to one aspect of the present disclosure, there is provided a robot cleaner, comprising: an image sensor unit configured to capture image information when an operation instructing command is received; and a controller configured to analyze the image information captured by the image sensor unit, and to control a cleaning operation based on a first cleaning algorithm selected from a plurality of pre-stored cleaning algorithms based on a result of the analysis.

According to another aspect of the present disclosure, there is also provided a controlling method of a robot cleaner, the method comprising: capturing first image information when an operation instructing command is received; analyzing the captured first image information; selecting, from a plurality of cleaning algorithms, a first cleaning algorithm corresponding to an analysis result; and controlling a cleaning operation based on the selected first cleaning algorithm.

The foregoing and other objects, features, aspects and advantages of the present disclosure will become more apparent from the following detailed description of the present disclosure when taken in conjunction with the accompanying drawings.

Advantageous Effects of Invention

Therefore, one aspect of the detailed description is to provide a robot cleaner capable of performing a cleaning operation by using at least one cleaning algorithm selected from a plurality of cleaning algorithms based on an analysis result with respect to a captured image, and a controlling method thereof.

Another aspect of the detailed description is to provide a robot cleaner capable of performing a cleaning operation by selecting a cleaning algorithm suitable for the peripheral circumstances based on image information captured during a cleaning operation, and a controlling method thereof.

Another aspect of the detailed description is to provide a robot cleaner capable of performing a cleaning operation by recognizing peripheral circumstances during a cleaning operation, and by selecting an optimized cleaning algorithm according to the recognized peripheral circumstances, and a controlling method thereof.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, preferred embodiments of the present invention will be explained in more detail with reference to the attached drawings. The same components will be provided with the same reference numerals, and detailed explanations thereof will be omitted.

Figure 1:
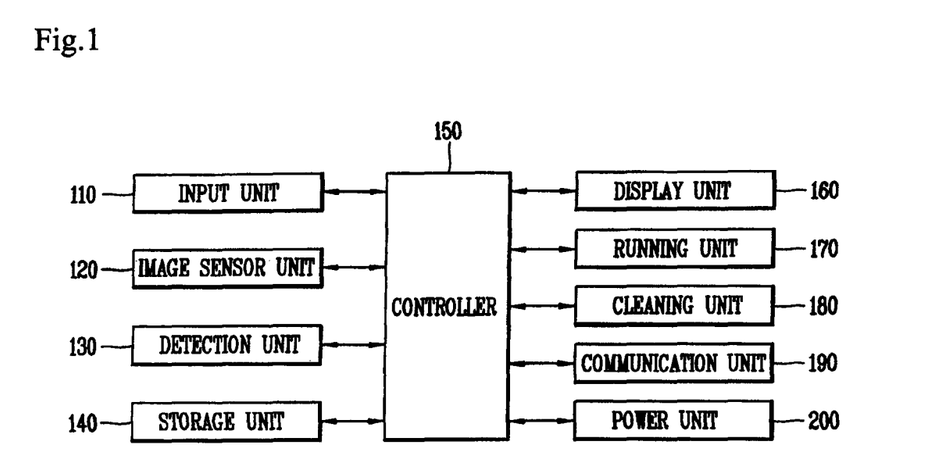
FIG. 1 is a block diagram showing a configuration of a robot cleaner according to a first embodiment of the present invention.

FIG. 1 is a block diagram showing a configuration of a robot cleaner according to a first embodiment of the present invention.

As shown in FIG. 1, the robot cleaner 10 comprises an input unit 110, an image sensor unit 120, a detection unit 130, a storage unit 140, a controller 150, a display unit 160, a running unit 170, a cleaning unit 180, a communication unit 190 and a power unit 200. All of the components of the robot cleaner 10 shown in FIG. 1 are not necessarily required. That is, of the robot cleaner 10 may have a larger or smaller number of components than the number of the components shown in FIG. 1.

The input unit 110 receives a signal as a user manipulates buttons or selects any function, or receives a generated command or a control signal by touching/scrolling a displayed screen.

The input unit 110 receives a signal corresponding to information inputted by a user, and may be implemented as various devices such as a keypad, a touch screen, a Jog & shuttle, a microphone, a mouse, a stylus pen and a touch pen.

The input unit 110 includes an operation instructing command button, a preset specific button for capturing image information, a running button, a stopping button, etc.

The image sensor unit 120 captures image information under control of the controller 150.

Figure 2:
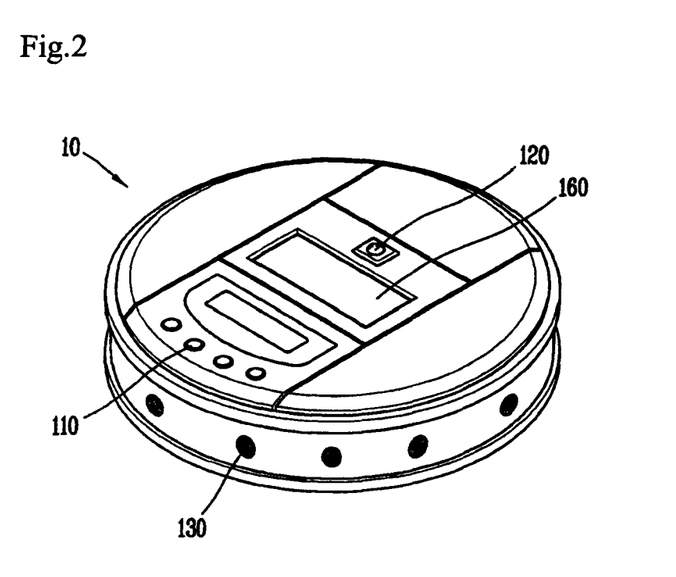
FIG. 2 is a view of the robot cleaner according to a first embodiment of the present invention.

As shown in FIG. 2, the image sensor unit 120 includes one or more cameras provided on an upper surface of the robot cleaner 10, and configured to capture the upper side perpendicular to a moving direction of the robot cleaner 10. That is, the image sensor unit 120 is provided with an image sensor such as a camera for capturing the upper side, thereby generating information on upper images. Then, the image sensor unit 120 image-processes objects installed on the ceiling or a wall surface, and outputs the images.

The image sensor unit 120 is provided on a front surface (or side surface) of the robot cleaner 10, and includes one or more cameras configured to capture a front side (a moving direction of the robot cleaner 10) or a lateral side. Alternatively, the image sensor unit 120 may be provided with one or more cameras on an upper surface and a front surface of the robot cleaner 10, respectively.

The detection unit 130 is provided on a side surface of the robot cleaner 10, and is configured to detect an object (or obstacle) located within a predetermined region (cleaning region).

The detection unit 130 is configured to transmit a signal generated from a supersonic sensor, an infrared sensor, a radio frequency (RF) sensor, etc., and includes a distance detection sensor configured to detect a position of an obstacle and a distance from the obstacle through a signal received in response to the transmitted signal, a collision sensor configured to detect an obstacle by colliding with the obstacle, etc.

The storage unit 140 stores therein each kind of information including each type of menu screens, a plurality of cleaning algorithms, preset priority information corresponding to the plurality of cleaning algorithms, and a cleaning map.

The storage unit 140 also stores therein various user interfaces (UI) and/or graphic user interfaces (GUI).

The storage unit 140 also stores therein data and programs necessary for the robot cleaner 10 to be operated.

In a case that the robot cleaner 10 performs a cleaning operation, the storage unit 140 also stores therein a moving path of the robot cleaner 10, a cleaning algorithm used for each moving path, etc.

The storage unit 140 stores therein each kind of information received through the communication unit 190 (map data, cleaning algorithm, each kind of control signals, etc.).

The controller 150 is configured to entirely control the robot cleaner 10.

The controller 150 may determine a location of the robot cleaner 10 based on image information outputted from the image sensor unit 120, and/or location information recognized by a location recognition unit (not shown).

The controller 150 may receive a signal transmitted from an external beacon through the communication unit 190, and may determine a location of the robot cleaner 10 based on the received signal.

When an operation instructing command button (not shown) provided at the input unit 110 is selected (or an operation instructing command is received), or when an operation instructing command button (not shown) displayed on the display unit 160 is selected, the controller 150 generates a first control signal for capturing image information to output the generated signal to the image sensor unit 120.

The controller 150 analyzes image information captured by the image sensor unit 120, and selects one of a plurality of cleaning algorithms pre-stored in the storage unit 140 based on a result of the analysis. Also, the controller 150 controls a cleaning operation by controlling the running unit 170 and the cleaning unit 180 based on the selected cleaning algorithm (e.g., first cleaning algorithm).

Also, the controller 150 generates a second control signal for capturing image information at a preset time interval, and outputs this generated signal to the image sensor unit 120.

When a preset specific button (not shown) provided at the input unit 110 or displayed on the display unit 160 is selected, the controller 150 generates a second control signal for capturing image information to output the generated signal to the image sensor unit 120.

Also, the controller analyzes the image information captured by the image sensor unit 120 based on the second control signal, and selects at least one (e.g., second cleaning algorithm) of a plurality of cleaning algorithms pre-stored in the storage unit 140 based on a result of the analysis.

Also, the controller 150 compares the first cleaning algorithm by which the current cleaning operation is performed, with the second cleaning algorithm selected through analysis of the image information captured according to the second control signal. If the two algorithms are different from each other as a result of the comparison, the controller 150 performs a cleaning operation by controlling the running unit 170 and the cleaning unit 180 based on the second cleaning algorithm.

On the other hand, if the two algorithms are equal to each other as a result of the comparison, the controller 150 performs a cleaning operation by controlling the running unit 170 and the cleaning unit 180 based on the first cleaning algorithm for the current cleaning operation.

Also, the controller 150 compares preset first priority information corresponding to the first cleaning algorithm for the current cleaning, with preset second priority information corresponding to the second cleaning algorithm selected through analysis of the image information captured according to the second control signal. Then, the controller 150 controls the running unit 170 and the cleaning unit 180 based on a cleaning algorithm having a higher priority, thereby performing a cleaning operation.

Also, the controller 150 controls each information of the robot cleaner 10 including a button selection state (or button input state), an operation state of the robot cleaner 10, etc. selected by the input unit 110 or the display unit 160, to be displayed on the display unit 160.

In a case that the robot cleaner 10 performs a cleaning operation, the controller 150 makes a cleaning map based on a moving path of the robot cleaner 10. If the robot cleaner 10 performs a cleaning operation based on the cleaning map, the controller 150 distinguishes a cleaned region having been cleaned within the cleaning map, from a non-cleaned region.

The display unit 160 is installed on an upper surface or a side surface of the robot cleaner 10, and displays each information generated by the controller 150. Here, the display unit 160 may include at least one of a Liquid Crystal Display (LCD), a Thin Film Transistor-Liquid Crystal Display (TFT LCD), an Organic Light-Emitting Diode (OLED), a Flexible Display, a Field Emission Display (FED) and a 3D Display.

Some of these display units 160 may be configured to be transparent or semi-transparent so that outside (or inside of the robot cleaner 10) can be viewed therethrough. These types of display units may be called as transparent displays. And, representative transparent displays include TOLED (Transparent OLED), etc.

The robot cleaner 10 may include two or more display units 160 according to an implementation method thereof. For example, the robot cleaner 10 may include a plurality of display units integrally or separately disposed on one surface, or a plurality of display units disposed on different surfaces.

Meanwhile, when a sensor (referred to as a touch sensor, hereinafter) for detecting a touch operation of the display unit 160 is overlaid in a layered manner (referred to as a touch screen), the display unit 160 may function as both an input device and an output device. The touch sensor may have, for example, the form of a touch film, a touch sheet, a touch pad, and the like.

The touch sensor may be configured to convert the pressure applied to a particular portion of the display unit 160 or a change in capacitance generated at a particular portion of the display unit 160 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 150. Accordingly, the controller 150 can recognize a touched region of the display unit 160.

When displaying each information generated by the controller 150, the display unit 160 may display various contents by using a user interface and/or a graphic user interface included in the storage unit 140. Here, the contents outputted on the display unit 160 may include menu screens for outputting various text or image data, and data such as icons, list menus, combo boxes and the like.

The robot cleaner 10 may further comprise a voice output unit (not shown) configured to output voice information included in each information generated by the controller 150. Here, the voice output unit may be implemented as a speaker.

The running unit 170 includes one or more wheels, which are driven by a driving unit (not shown) such as a motor.

The running unit 170 performs running operations such as moving, stopping and direction change under control of the controller 150.

Sensors including an encoder may be connected to the running unit 170.

The cleaning unit 180 is provided on a lower surface of the robot cleaner 10, and performs a cleaning operation by sucking foreign materials disposed at a lower side, under control of the controller 150, when the robot cleaner 10 is in a moving state or a stopped state.

The cleaning unit 180 may include an air purifier configured to purify pollutants included in the air.

The communication unit 190 is connected with an external terminal such as a remote controller, a mobile terminal and an information providing center, through a wired/wireless communication method. Here, the radio internet module may include wireless LAN (WLAN), Wi-Fi, Wireless Broadband (Wibro), World Interoperability for Microwave Access (Wimax), High Speed Downlink Packet Access (HSDPA), IEEE 802.16, Long Term Evolution (LTE), Wireless Mobile Broadband Service (WMBS), etc. And, the short-range communication module may include Bluetooth, Radio Frequency Identification (RFID), Infrared Data Association (IrDA), Ultra Wideband (UWB), Zigbee, etc.

The communication unit 190 also receives each information (including information on a control signal, a cleaning map, etc.) transmitted from the external terminal.

The power unit 200 stores or charges power supplied from an external power supply device.

The power unit 200 may include a battery consisting of a single device, or may include one pack (battery pack) consisting of a plurality of batteries.

In the case that the power unit 200 is provided with a plurality of batteries, the plurality of batteries may be serially connected to each other, and one or more safety switches may be disposed between the plurality of batteries.

The power unit 200 may be supplied with power by a wired/wireless charging method with the external power supply device. That is, the power unit 200 may be charged by being directly connected to the external power supply device by a power socket. Alternatively, the power unit 200 may be charged by applying one of a magnetic resonance coupling method, an electromagnetic induction method and a radio wave method between a transceiver provided at the power unit 200 and a transceiver provided at the external power supply device. That is, the power unit 200 and the external power supply device may be configured to be charged by radio. Here, the configurations of the transceivers may be easily designed by those skilled in the art.

The robot cleaner of the present invention may efficiently perform a cleaning operation by analyzing information on captured images, and by using at least one of a plurality of cleaning algorithms based on a result of the analysis.

Furthermore, the robot cleaner of the present invention may perform a cleaning operation suitable for the peripheral circumstances by selecting a cleaning algorithm suitable for the peripheral circumstances based on image information captured during the cleaning operation.

Hereinafter, a controlling method of a robot cleaner according to the present invention will be explained in more detail with reference to FIGS. 1 to 4.

Figure 3:
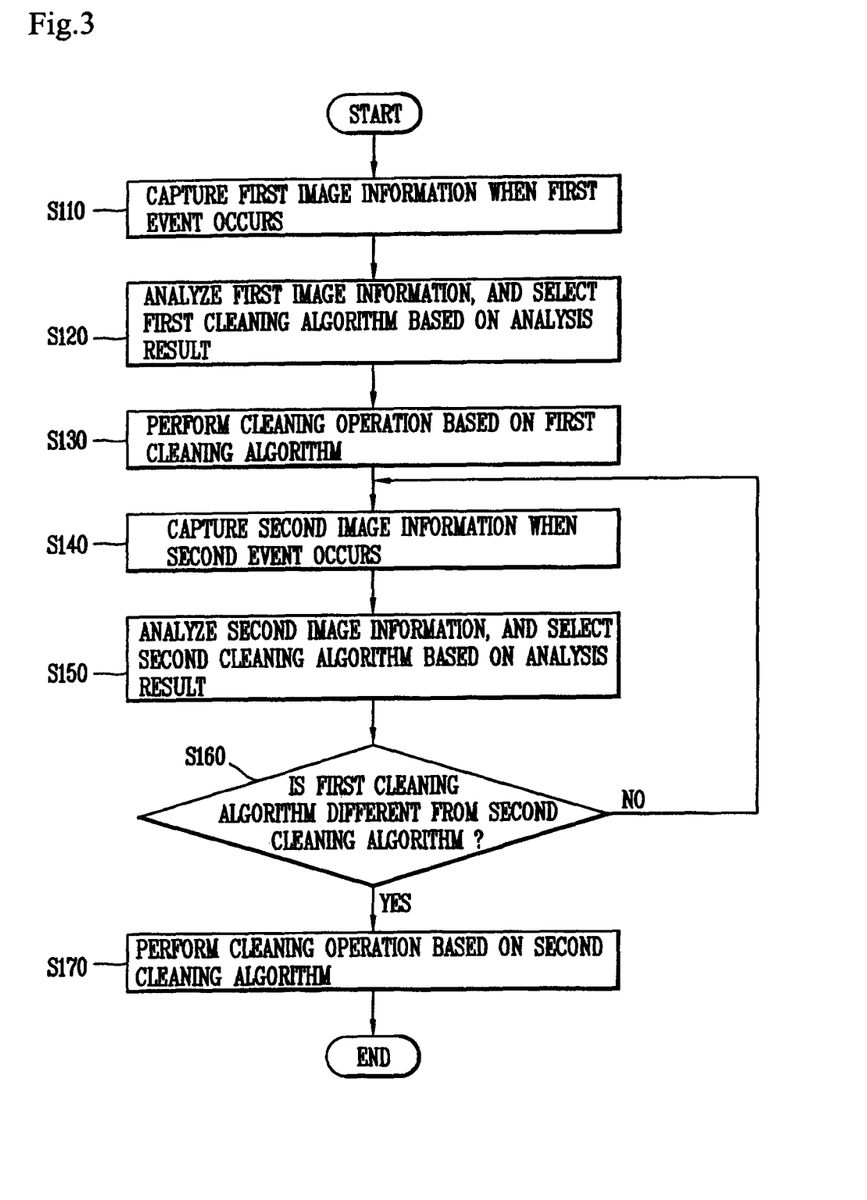
FIG. 3 is a flowchart showing a controlling method of a robot cleaner according to a first embodiment of the present invention.

FIG. 3 is a flowchart showing a controlling method of a robot cleaner according to a first embodiment of the present invention.

Firstly, the image sensor unit 120 captures first image information when the operation instructing command button provided at the input unit 110 or displayed on the display unit 160 is selected. Here, the image sensor unit 120 is provided on one side surface (upper surface or side surface) of the robot cleaner 10, and captures the upper side or front side (or lateral side). And, the image sensor unit 120 outputs information on the captured first upper or front image.

A selected state of the operation instructing command button, and a captured state by the image sensor unit 120 (or image information captured by the image sensor unit 120) may be displayed on the display unit 160, under control of the controller 150 (S110).

Then, the controller 150 analyzes the first image information (including first upper image information, first front image information, etc.) outputted from the image sensor unit 120. Then, the controller 150 selects at least one cleaning algorithm among a plurality of cleaning algorithms pre-stored in the storage unit 140 based on a result of the analysis.

More concretely, if image information can be analyzed as an analysis result with respect to the first image information outputted from the image sensor unit 120, the controller 150 selects any cleaning algorithm based on image information among the plurality of pre-stored cleaning algorithms. On the other hand, if image information cannot be analyzed, the controller 150 selects any cleaning algorithm not based on image information among the plurality of pre-stored cleaning algorithms. Here, the cleaning algorithm not based on image information may be a cleaning algorithm (e.g., cleaning algorithm for avoiding an obstacle) among a plurality of cleaning algorithms which are not based on image information.

As one example, if it is determined that no obstacle exists based on the first image information outputted from the image sensor unit 120, the controller 150 selects a cleaning algorithm based on image information (e.g., optimized cleaning algorithm for cleaning a place having no obstacle) among the plurality of pre-stored cleaning algorithms.

As another example, if it is determined that the number of obstacles is more than a predetermined number based on the first image information outputted from the image sensor unit 120, the controller 150 selects an optimized cleaning algorithm for avoiding an obstacle among the plurality of pre-stored cleaning algorithms (S120).

Then, the controller 150 performs a cleaning operation by controlling the running unit 170 and/or the cleaning unit 180 based on the selected cleaning algorithm.

While the robot cleaner 10 performs a cleaning operation, the controller 150 may make a cleaning map based on a moving path of the robot cleaner 10, and may display the made cleaning map (including information on a cleaned region and a non-cleaned region) on the display unit 160 (S130).

Then, the image sensor unit 120 captures second image information based on a control signal generated by the controller 150 when a preset time interval has passed, or when a preset specific button provided at the input unit 110 or the display unit 160 has been selected (S140).

Then, the controller 150 analyzes the second image information (including second upper image information, second front image information, etc.) outputted from the image sensor unit 120. Then, the controller 150 selects at least one cleaning algorithm among a plurality of cleaning algorithms pre-stored in the storage unit 140 based on a result of the analysis.

More concretely, if image information can be analyzed as an analysis result with respect to the second image information outputted from the image sensor unit 120, the controller 150 selects any cleaning algorithm based on image information among the plurality of pre-stored cleaning algorithms. On the other hand, if image information cannot be analyzed, the controller 150 selects any cleaning algorithm not based on image information among the plurality of pre-stored cleaning algorithms. Here, the controller 150 may select a plurality of cleaning algorithms (S150).

Then, the controller 150 compares the cleaning algorithm by which the current cleaning operation is performed, with the cleaning algorithm selected through analysis of the second image information (S160). If the two algorithms are different from each other as a result of the comparison, the controller 150 performs a cleaning operation by controlling the running unit 170 and the cleaning unit 180 based on the cleaning algorithm selected based on an analysis result of the second image information.

When the previous cleaning operation (e.g., cleaning operation using a cleaning algorithm selected based on an analysis result of the first image information) is changed into a new cleaning operation (e.g., cleaning operation using a cleaning algorithm selected based on an analysis result of the second image information), the controller 150 may generate guidance information indicating the change of the cleaning operation to output the guidance information on the display unit 160.

As one example, when the current cleaning operation is changed from a cleaning operation including image information selected based on an analysis result of the first image information (e.g., optimized cleaning algorithm for cleaning a place having no obstacle) into a cleaning operation not based on image information selected based on an analysis result of the second image information (e.g., optimized cleaning algorithm for avoiding an obstacle), the controller 150 may generate guidance information including a message, The current cleaning operation has changed into a cleaning operation based on obstacle avoidance from a cleaning operation based on image information, and output the guidance information on the display unit 160 (S170).

When the cleaning algorithm selected based on an analysis result of the second image information is consistent with the cleaning algorithm for the current cleaning operation as a check result in S160, the controller 150 performs a cleaning operation by controlling the running unit 170 and the cleaning unit 180 based on the cleaning algorithm for the current cleaning operation.

Figure 4:
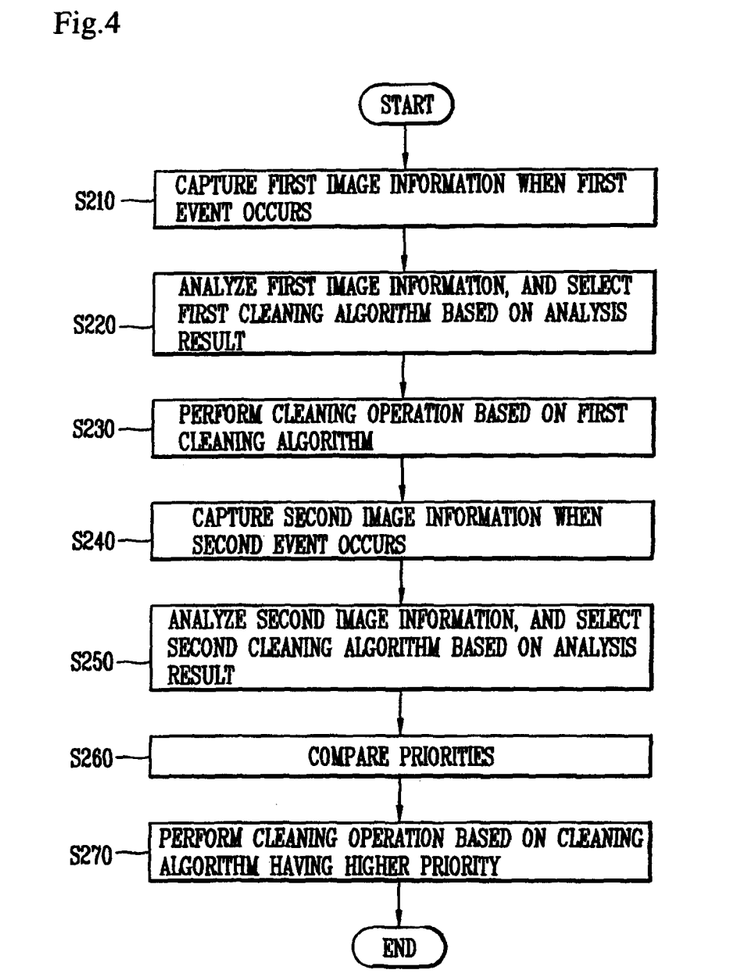
FIG. 4 is a flowchart showing a controlling method of a robot cleaner according to a second embodiment of the present invention.

FIG. 4 is a flowchart showing a controlling method of a robot cleaner according to a second embodiment of the present invention.

Firstly, the image sensor unit 120 captures first image information when the operation instructing command button provided at the input unit 110 or displayed on the display unit 160 is selected. Here, the image sensor unit 120 is provided on one side surface (upper surface or side surface) of the robot cleaner 10, and captures the upper side or front side (or lateral side). And, the image sensor unit 120 outputs information on the captured first upper or front image.

A selected state of the operation instructing command button, and a captured state by the image sensor unit 120 (or image information captured by the image sensor unit 120) may be displayed on the display unit 160, under control of the controller 150 (S210).

Then, the controller 150 analyzes the first image information (including first upper image information, first front image information, etc.) outputted from the image sensor unit 120. Then, the controller 150 selects at least one cleaning algorithm among a plurality of cleaning algorithms pre-stored in the storage unit 140 based on a result of the analysis.

More concretely, if image information can be analyzed as an analysis result with respect to the first image information outputted from the image sensor unit 120, the controller 150 selects any cleaning algorithm based on image information among the plurality of pre-stored cleaning algorithms. On the other hand, if image information cannot be analyzed, the controller 150 selects any cleaning algorithm not based on image information among the plurality of pre-stored cleaning algorithms. Here, the cleaning algorithm not based on image information may be a cleaning algorithm (e.g., cleaning algorithm for avoiding an obstacle) among a plurality of cleaning algorithms which are not based on image information.

As one example, if it is determined that no obstacle exists based on the first image information outputted from the image sensor unit 120, the controller 150 selects a cleaning algorithm based on image information (e.g., optimized cleaning algorithm for cleaning a place having no obstacle) among the plurality of pre-stored cleaning algorithms.

As another example, if it is determined that the number of obstacles is more than a predetermined number based on the first image information outputted from the image sensor unit 120, the controller 150 selects an optimized cleaning algorithm for avoiding an obstacle among the plurality of pre-stored cleaning algorithms (S220).

Then, the controller 150 performs a cleaning operation by controlling the running unit 170 and the cleaning unit 180 based on the selected cleaning algorithm.

While the robot cleaner 10 performs a cleaning operation, the controller 150 may make a cleaning map based on a moving path of the robot cleaner 10, and may display the made cleaning map (including information on a cleaned region and a non-cleaned region) on the display unit 160 (S230).

Then, the image sensor unit 120 captures second image information based on a control signal generated by the controller 150 when a preset time interval has passed, or when a preset specific button provided at the input unit 110 or the display unit 160 has been selected (S240).

Then, the controller 150 analyzes the second image information (including second upper image information, second front image information, etc.) outputted from the image sensor unit 120. Then, the controller 150 selects at least one cleaning algorithm among a plurality of cleaning algorithms pre-stored in the storage unit 140 based on a result of the analysis.

More concretely, if image information can be analyzed as an analysis result with respect to the second image information outputted from the image sensor unit 120, the controller 150 selects any cleaning algorithm based on image information among the plurality of pre-stored cleaning algorithms. On the other hand, if image information cannot be analyzed, the controller 150 selects any cleaning algorithm not based on image information among the plurality of pre-stored cleaning algorithms. Here, the controller 150 may select a plurality of cleaning algorithms (S250).

Also, the controller 150 compares preset first priority information corresponding to the cleaning algorithm for the current cleaning operation, with preset second priority information corresponding to the cleaning algorithm selected based on an analysis result of the second image information (S260). Then, the controller 150 controls the running unit 170 and the cleaning unit 180 based on a cleaning algorithm having a higher priority, thereby performing a cleaning operation.

When the previous cleaning operation (e.g., cleaning operation using a cleaning algorithm selected based on an analysis result of the first image information) is changed into a new cleaning operation (e.g., cleaning operation using a cleaning algorithm selected based on an analysis result of the second image information), the controller 150 may generate guidance information indicating the change of the cleaning operation to output the guidance information on the display unit 160.

As one example, when the current cleaning operation is changed from a cleaning operation including image information selected based on an analysis result of the first image information (e.g., optimized cleaning algorithm for cleaning a place having no obstacle) into a cleaning operation not based on image information selected based on an analysis result of the second image information (e.g., optimized cleaning algorithm for avoiding an obstacle), the controller 150 may generate guidance information including a message, The current cleaning operation has changed into a cleaning operation based on obstacle avoidance from a cleaning operation based on image information, and output the guidance information on the display unit 160 (S270).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A robot cleaner, comprising:
   an input unit configured to receive a user input;
   an image sensor unit configured to capture image information when the user input is received;
   a controller configured to analyze the image information captured by the image sensor unit, and to control a cleaning operation based on a first cleaning algorithm,
   an output unit configured to output predetermined information;
   wherein the controller determines whether the image information can be analyzed or not,
   when the controller determines that image information is capable of being analyzed, the controller selects one cleaning algorithm as the first cleaning algorithm based on image information from among a plurality of pre-stored cleaning algorithms,
   when the controller determines that the image information can not be analyzed, the controller selects one cleaning algorithm as the first cleaning algorithm based on a predetermined information being different from the image information from among a plurality of pre-stored cleaning algorithms,
   wherein the image sensor unit captures image information at a preset time interval under control of the controller during the cleaning operation,
   wherein the controller analyzes the image information captured at the preset time interval, and selects a second cleaning algorithm, from among the plurality of pre-stored cleaning algorithms, based on a result of the analysis, wherein when the controller determines that the image information can be analyzed, the controller selects one cleaning algorithm as the second cleaning algorithm based on image information among the plurality of pre-stored cleaning algorithms,
   when the controller determines that the image information can not be analyzed, the controller selects another cleaning algorithm as the cleaning algorithm based on a predetermined information being different from the image information from among a plurality of pre-stored cleaning algorithms,
   wherein the controller generates guidance information indicating the change of the cleaning operation to output the guidance information on the output unit.

2. The robot cleaner of claim 1, wherein the image sensor unit captures an upper side or a front side, and outputs information on the captured upper or front side.

3. The robot cleaner of claim 1, wherein when the controller selects, from the plurality of cleaning algorithms, the first cleaning algorithm, the first cleaning algorithm corresponds to an analysis result of the image information, and controls a cleaning operation based on the selected first cleaning algorithm.

4. The robot cleaner of claim 1, wherein the controller controls a cleaning operation based on the first cleaning algorithm when the first and second cleaning algorithms are equal to each other,
   wherein the controller controls a cleaning operation based on the second cleaning algorithm when the first and second cleaning algorithms are different from each other.

5. The robot cleaner of claim 1, wherein the controller compares preset first priority information corresponding to the first cleaning algorithm, with preset second priority information corresponding to the second cleaning algorithm, and controls a cleaning operation based on a cleaning algorithm having a higher priority.

6. The robot cleaner of claim 1, wherein when the controller determines that no obstacle exists based on the result of the analysis, the controller selects the first cleaning algorithm to clean a place having no obstacle among the plurality of pre-stored cleaning algorithm.

7. The robot cleaner of claim 1, wherein while the robot cleaner performs the cleaning operation based on the selected first cleaning algorithm, the controller makes a cleaning map based on a moving path of the robot cleaner.

8. The robot cleaner of claim 7, wherein the robot cleaner displays the made cleaning map on a display unit, wherein the displayed cleaning map includes information on a cleaned region and a non-cleaned region.

9. The robot cleaner of claim 1, wherein when an operation instructing command is received, the image sensor unit captures the image information and then the controller controls the cleaning operation based on the first cleaning algorithm or the second cleaning algorithm.

10. A controlling method of a robot cleaner, the method comprising:
    receiving, at an input unit, a user input for capturing image information;
    capturing first image information when an operation instructing command is received;
    analyzing the captured first image information;
    determining whether the first image information can be analyzed or not;
    selecting a first cleaning algorithm or a second cleaning algorithm from a plurality of cleaning algorithms, wherein one cleaning algorithm is selected as the first cleaning algorithm based on the first image information from among the plurality of cleaning algorithms when the first image information is determined as being able to be analyzed, and wherein one cleaning algorithm is selected as the first cleaning algorithm based on criteria other than a predetermined information being different from the first image information from among a plurality of pre-stored cleaning algorithms when the determining determines that the first image information can not be analyzed; and
    controlling a cleaning operation based on the selected first cleaning algorithm;
    capturing second image information at a preset time interval during the cleaning operation;
    analyzing the captured second image information;
    determining whether the second image information can be analyzed or not;
    selecting a second cleaning algorithm from the plurality of cleaning algorithms, wherein one cleaning algorithm is selected as the second cleaning algorithm based on the second image information from among the plurality of cleaning algorithms, when the determining determines that the second image information can be analyzed, and
    wherein one cleaning algorithm is selected as the second cleaning algorithm based on a predetermined information being different from the second image information from among a plurality of pre-stored cleaning algorithms, when the determining determines that the second image information can not be analyzed;
    controlling a cleaning operation based on the selected second cleaning algorithm; and
    generating guidance information indicating the change of the cleaning operation to output the guidance information on an output unit,
    wherein the controlling of the cleaning operation based on the second cleaning algorithm comprises:
        checking whether the first cleaning algorithm firstly selected is equal to the second cleaning algorithm secondly selected;
        when the first cleaning algorithm firstly selected is equal to the second cleaning algorithm secondly selected as a check result, controlling a cleaning operation based on the first or second cleaning algorithms; and
        when the first cleaning algorithm firstly selected is different from the second cleaning algorithm secondly selected as a check result, controlling a cleaning operation based on the second cleaning algorithm.

11. The method of claim 10, wherein the capturing of the first image information comprises:
    capturing an upper side or a front side by an image sensor unit; and
    outputting information on the captured upper or front side.

12. The method of claim 10, further comprising:
    comparing preset first priority information corresponding to the first or second cleaning algorithms, with preset second priority information corresponding to the second cleaning algorithm; and
    controlling a cleaning operation based on a cleaning algorithm having a higher priority as a result of the comparison.

13. The method of claim 10, wherein the selecting the first cleaning algorithm includes selecting the first cleaning algorithm to clean a place having no obstacle among the plurality of cleaning algorithms when it is determined that no obstacles exists based on the analysis result.

14. The method of claim 10, wherein the controlling the cleaning operation based on the selected first cleaning comprises making a cleaning map based on a moving path of the robot cleaner while the robot cleaner performs the cleaning operation based on the selected first cleaning algorithm.

* * * * *